(12) United States Patent
Das et al.

(10) Patent No.: US 11,685,808 B2
(45) Date of Patent: Jun. 27, 2023

(54) OLIGOMER RESIN COMPOSITIONS

(71) Applicant: NOVOSET, LLC, Peapack, NJ (US)

(72) Inventors: Sajal Das, Bedminster, NJ (US); Paul Boothe, Brooklyn, NY (US); Patrick Shipman, Stirling, NJ (US)

(73) Assignee: NOVOSET, LLC, Peapack, NJ (US)

( * ) Notice: Subject to any disclaimer, the term of this patent is extended or adjusted under 35 U.S.C. 154(b) by 255 days.

(21) Appl. No.: 17/136,569

(22) Filed: Dec. 29, 2020

(65) Prior Publication Data

US 2022/0411573 A1 Dec. 29, 2022

Related U.S. Application Data

(60) Provisional application No. 63/037,791, filed on Jun. 11, 2020.

(51) Int. Cl.
| | |
|---|---|
| C08G 61/02 | (2006.01) |
| B33Y 10/00 | (2015.01) |
| B33Y 70/00 | (2020.01) |
| B33Y 80/00 | (2015.01) |

(52) U.S. Cl.
CPC .............. *C08G 61/02* (2013.01); *B33Y 10/00* (2014.12); *B33Y 70/00* (2014.12); *B33Y 80/00* (2014.12); *C08G 2115/00* (2021.01); *C08G 2261/164* (2013.01); *C08G 2261/226* (2013.01); *C08G 2261/228* (2013.01); *C08G 2261/3321* (2013.01); *C08G 2261/3325* (2013.01); *C08G 2261/36* (2013.01); *C08G 2261/40* (2013.01); *C08G 2261/90* (2013.01)

(58) Field of Classification Search
CPC .................................................... C08G 61/02
See application file for complete search history.

(56) References Cited

U.S. PATENT DOCUMENTS

| | | | |
|---|---|---|---|
| 2,726,232 | A | 12/1955 | Upson |
| 3,210,331 | A | 10/1965 | Renner et al. |
| 3,242,112 | A | 3/1966 | Renner et al. |
| 3,322,572 | A | 5/1967 | Renner et al. |
| 3,560,583 | A | 2/1971 | Stewart, Jr. |
| 3,865,683 | A | 2/1975 | Schnee et al. |
| 3,900,449 | A | 8/1975 | Rembold et al. |
| 4,140,843 | A | 2/1979 | Widmer et al. |
| 5,210,351 | A | 5/1993 | Venier et al. |
| 5,262,501 | A | 11/1993 | Zahir et al. |
| 6,063,948 | A | 5/2000 | Gruter et al. |
| 6,232,516 | B1 | 5/2001 | van Beek et al. |
| 6,319,611 | B1 | 11/2001 | Mathias et al. |
| 7,041,331 | B2 | 5/2006 | Lamola et al. |
| 8,674,038 | B2 | 3/2014 | Nakamura et al. |
| 8,975,427 | B2 | 3/2015 | Harlan et al. |
| 9,902,695 | B1 | 2/2018 | Das et al. |
| 2019/0210967 | A1 | 7/2019 | Das et al. |
| 2021/0189043 | A1 | 6/2021 | Horigome et al. |

FOREIGN PATENT DOCUMENTS

| | | |
|---|---|---|
| CN | 103232589 a | 8/2013 |
| EP | 0441460 B | 8/1991 |
| GB | 899946 A | 6/1962 |
| WO | WO2021-252728 A1 | 12/2021 |

*Primary Examiner* — Catherine S Branch
(74) *Attorney, Agent, or Firm* — Ernest D. Buff & Associates, LLC; Ernest D. Buff

(57) ABSTRACT

A resin has a structure defined by Formula (I)

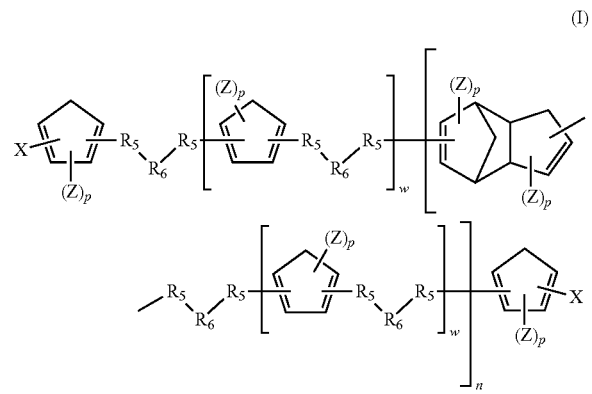

(I)

wherein: (a) each $R_5$ is independently a methylene group ($CH_2$), or a methylene group substituted with one or more —H, —$CH_3$, or halogen functionalities; (b) each $R_6$ is independently a bond or a straight-chain or branched, linear or cyclic, saturated or unsaturated, substituted or unsubstituted, aliphatic or aromatic group having between 1 and 2 carbon atoms; (c) each X is independently a functionality possessing at least one non-aromatic alkene or alkyne moiety; (d) each Z is independently either H or X; (e) each Z is independently either H or X, and each p is independently an integer from 1-4; (f) each w is independently 0, or an integer greater than or equal to 1, and (i) when w is 0, the bracket region represents a bond and n is 0, or an integer greater than or equal to 1; and (ii) when n is 0, the bracket region represents a bond. The resin is especially well suited for use in a base station, circuit board, server, router, radome or satellite structure, as well as such processes as digital light printing (DLP), continuous liquid interface printing (CLIP), and Stereolithography (SL).

24 Claims, No Drawings

OLIGOMER RESIN COMPOSITIONS

BACKGROUND OF THE INVENTION

1. Field of the Invention

The invention relates to resins and composite materials; and more particularly to oligomer resin compositions that exhibit high glass transition temperatures and have low dielectric properties suitable for high frequency printed circuit boards, antennas, radomes, and other electronic devices.

2. Description of the Prior Art

Bis(cyclopentadienyl)-terminated organics and their Diels-Alder oligomers have been described in: U.S. Pat. Nos. 3,210,331; 5,262,501, and CN 103232589A. U.S. Pat. No. 2,726,232 discloses dimers and oligomers of bis(cyclopentadiene)s from reaction with aromatic bis(chloromethyl), but these compounds are of low shelf stability, thereby limiting their use as laminating resins. U.S. Pat. No. 5,262,501 describes the synthesis of dimers of bis(cyclopentadiene)s from reaction with 1,4-dichloro-2-butene and its use as a laminating resin. While it is known that this resin is more stable compared to the aromatic-linked bis(cyclopentadiene)s it proved to be of low glass transition temperatures and, consequently, of limited use for high-temperature resins. Furthermore, U.S. Pat. No. 5,262,501 described modifying dimers and oligomers of bis(cyclopentadiene)s from reaction with aromatic bis(chloromethyl) compounds to form spiroheptadienes and showed that they are more stable than pure bis(cyclopentadiene) oligomers and that these aromatic-linked species can generate high glass transition temperatures. However, these prior art workers have failed to teach the effect of multiple reactive species on the dicyclopentadiene formed during dimerization and oligomerization of the bis(cyclopentadienyl) compounds.

SUMMARY OF THE INVENTION

It has now been found that bis(substituted(aryl/alkyl)-cyclopentadiene) compounds and their dimers/oligomers have increased stability over their previously described pure alkyl-, or aryl-counterparts. Advantageously, these bis(substituted(aryl/alkyl)-cyclopentadiene) compounds can achieve high glass transition temperatures and have low dielectric properties suitable for high frequency printed circuit boards, antennas, radomes, and other electronic devices.

In one aspect, the present invention provides compounds having a structure defined by Formula (I):

wherein:

(a) each $R_5$ is independently a methylene group ($CH_2$), or a methylene group substituted with one or more —H, —$CH_3$, or halogen functionalities;

(b) each $R_6$ is independently a bond or a straight-chain or branched, linear or cyclic, saturated or unsaturated, substituted or unsubstituted, aliphatic or aromatic group having between 1 and 20 carbon atoms;

(c) each X is independently a functionality possessing at least one non-aromatic alkene, alkyne, $CH_3$—$(CH_2)_n$— (where n=0 to 12), or an aromatic moiety;

(d) each Z is independently either H or X and each p is independently an integer from 1-4;

(e) each w is independently 0, or an integer greater than or equal to 1; and (i) when w is 0, the bracket region represents a bond and n is 0, or an integer greater than or equal to 1; and (ii) when n is 0, the bracket region represents a bond.

In some embodiments of Formula (I), the value of w is equal to zero, representing a bond between the $R_5$ group and the cyclopentadiene or dicyclopentadiene. These compounds of Formula (I) may be defined by Formula (II):

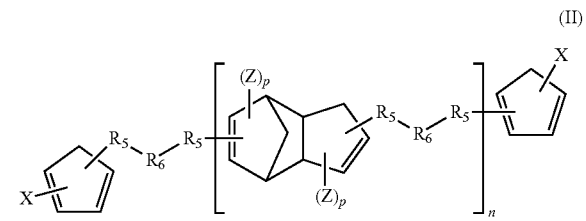

Polymers, copolymers and oligomers derived from resins having a structure defined by Formula (I) may be thermoset polymers with high glass transition temperature and other properties suitable for use in advanced material applications. The properties of these polymers may be tuned by using resins and resin blends containing more than one X moiety and/or more than one $R_6$ moiety.

Without being bound by example, a resin of Formula (I) where $R_6$ is an alkyl group may generate a polymer with a desirable polymerization rate but a low glass transition temperature, whereas a resin of Formula (I) where $R_6$ is an aryl group may generate a polymer with high glass transition temperature but undesirable polymerization rate. Combining resins with alkyl $R_6$ groups and resins with aryl $R_6$ groups may generate a polymer with improved overall properties compared to the polymer derived from any single resin of Formula (I).

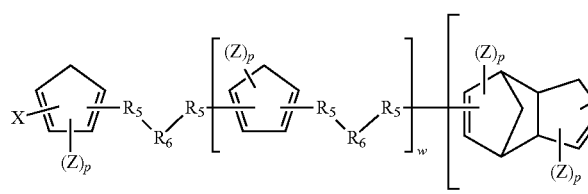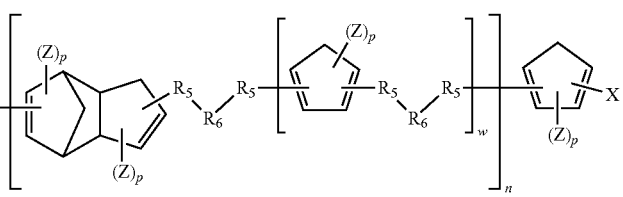

DETAILED DESCRIPTION OF THE INVENTION

The invention provides a thermosetting resin with a high glass transition temperature, which has excellent dielectric properties and low water absorption. Embodiments of this invention include thermosetting resins which are suitable for applications that require ultra-low loss dielectric properties and ultra-low moisture absorption properties. Polymers, copolymers, or oligomers derived from these thermosetting resins have a dissipation (Df) value ranging from between about 0.0001 to about 0.004; a dielectric (Dk) value ranging from between about 1.5 to about 3 at 1-50 GHz; a Tg greater than 150° C.; and a molecular weight ranging from about 200 to about 1,000,000 Da.

It should also be understood that, unless clearly indicated to the contrary, in any methods claimed herein that include more than one step or act, the order of the steps or acts of the method is not necessarily limited to the order in which the steps or acts of the method are recited. It should also be understood that where a variable (e.g., "w") is used more than once in any formula or chemical structure, that each use of the variable in the Formula or chemical structure is independent of any other use unless explicitly noted otherwise. For example, if the variable "w" is used twice within the same Formula, each "w"' may be the same or different, i.e., if "w" is defined as 0 or an integer ranging from 1 to 150, each "w" may independently be selected from 0 or an integer ranging from 1 to 150. Likewise, and again by way of example, if the moiety "$R_5$" is defined as —CH— or —C—$R_{12}$, then each time $R_5$ is used in a formula or chemical structure, each $R_5$ may independently be selected from —CH— or —C—$R_{12}$.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of."

As used herein, the term "alkyl" refers to a straight or branched hydrocarbon chain that comprises a fully saturated (no double or triple bonds) hydrocarbon group. By way of example only, the alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). As noted further herein, the alkyl group of the compounds may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from methyl, ethyl, propyl, isopropyl, n-butyl, isobutyl, sec-butyl, and t-butyl. Typical alkyl groups include, but are in no way limited to, methyl, ethyl, propyl, isopropyl, butyl, isobutyl, tertiary butyl, pentyl and hexyl. The alkyl group may be substituted or unsubstituted.

As used herein, the term "alkenyl" refers to an alkyl group that contains in the straight or branched hydrocarbon chain one or more double bonds. An alkenyl group may be unsubstituted or substituted.

As used herein, the term "alkynyl" refers to an alkyl group that contains in the straight or branched hydrocarbon chain one or more triple bonds. An alkynyl group may be unsubstituted or substituted.

As used herein, the term "aryl" means an aromatic carbocyclic radical or a substituted carbocyclic radical containing preferably from 6 to 15 carbon atoms, such as phenyl, naphthyl, or anthryl or phenyl or naphthyl or anthryl optionally substituted by at least one of the substituents selected in the group constituted by alkyl, alkenyl, alkynyl, aryl, aralkyl, hydroxy, alkoxy, aryloxy, aralkoxy, carboxy, aroyl, halo, nitro, trihalomethyl, cyano, alkoxycarbonyl, aryloxycarbonyl, aralkoxycarbonyl, acylamino, aroylamino, carbamoyl, alkylcarbamoyl, dialkylcarbamoyl, alkylthio, arylthio, alkylene or —NYY' where Y and Y' are independently hydrogen, alkyl, aryl, or aralkyl.

As used herein, the term "resin" refers to a compound or mixture of compounds capable of being converted to a polymer material.

As used herein, the term "blend" refers, in some embodiments, to a mixture of two or more different species of resins or a resin and another polymer or copolymer.

As used herein, the terms "cure" or "curing" refer to processes of hardening a resin material.

As used herein, "cycloalkyl" of like terms (e.g., a cyclic alkyl group) refer to a completely saturated (no double or triple bonds) mono- or multi-cyclic hydrocarbon ring system. When composed of two or more rings, the rings may be joined together in a fused fashion. Cycloalkyl groups can contain 3 to 10 atoms in the ring(s) or 3 to 8 atoms in the ring(s). A cycloalkyl group may be unsubstituted or substituted. Typical cycloalkyl groups include, but are in no way limited to, cyclopropyl, cyclobutyl, cyclopentyl, cyclohexyl, cycloheptyl and cyclooctyl.

As used herein, "$C_a$ to $C_b$" in which "a" and "b" are integers refer to the number of carbon atoms in an alkyl, alkenyl or alkynyl group, or the number of carbon atoms in the ring of a cycloalkyl, cycloalkenyl, cycloalkynyl or aryl group, or the total number of carbon atoms and heteroatoms in a heteroalkyl, heterocyclyl, heteroaryl or heteroalicyclyl group. That is, the alkyl, alkenyl, alkynyl, ring of the cycloalkyl, ring of the cycloalkenyl, ring of the cycloalkynyl, ring of the aryl, ring of the heteroaryl or ring of the heteroalicyclyl can contain from "a" to "b," inclusive, carbon atoms. Thus, for example, a "$C_1$ to $C_4$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—. If no "a" and "b" are designated with regard to an alkyl, alkenyl, alkynyl, cycloalkyl cycloalkenyl, cycloalkynyl, aryl, heteroaryl or heteroalicyclyl group, the broadest range described in these definitions is to be assumed.

As used herein, the terms "halogen atom" or "halogen" mean any one of the radio-stable atoms of column 7 of the Periodic Table of the Elements, such as, fluorine, chlorine, bromine and iodine.

As used herein, the term "interpenetrating network," in accordance with the definition adopted by the IUPAC, refers to a polymeric system comprising two or more networks which are at least partially interlaced on a molecular scale, to form both chemical and physical bonds between the networks. The networks of an IPN cannot be separated unless chemical bonds are broken. In other words, an IPN structure represents two or more polymer networks that are partially chemically crosslinked and/or partially physically entangled.

As used herein, the term "polymer" is defined as being inclusive of homopolymers, copolymers, interpenetrating networks, and oligomers. Thus, the term polymer may be used interchangeably herein with the term homopolymers, copolymers, interpenetrating polymer networks, etc. The term "homopolymer" is defined as a polymer derived from a single species of monomer. The term "copolymer" is defined as a polymer derived from more than one species of monomer, including copolymers that are obtained by copolymerization of two monomer species, those obtained from three monomers species ("terpolymers"), those obtained from four monomers species ("quaterpolymers"), etc. The term "oligomer" is defined as a low molecular weight polymer in which the number of repeating units does not exceed twenty. The term "copolymer" is further defined as being inclusive of random copolymers, alternating copolymers, graft copolymers, and block copolymers. Copolymers, as that term is used generally, include interpenetrating polymer networks. The term "random copolymer" is defined as a copolymer comprising macromolecules in which the probability of finding a given monomeric unit at any given site in the chain is independent of the nature of the adjacent units. In a random copolymer, the sequence distribution of monomeric units follows Bernoullian statistics. The term "alternating copolymer" is defined as a copolymer comprising macromolecules that include two species of monomeric units in an alternating sequence.

Whenever a group or moiety is described as being "substituted" or "optionally substituted" (or "optionally having" or "optionally comprising"), that group may be unsubstituted or substituted with one or more of the indicated substituents. Likewise, when a group is described as being "substituted or unsubstituted" if substituted, the substituent(s) may be selected from one or more of the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxy, aryloxy, acyl, mercapto, alkylthio, arylthio, cyano, cyanate, halogen, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, an amino, ether, amino (e.g., a mono-substituted amino group or a disubstituted amino group), and protected derivatives thereof. Any of the above groups may include one or more heteroatoms, including O, N, or S. For example, where a moiety is substituted with an alkyl group, that alkyl group may comprise a heteroatom selected from O, N, or S (e.g. —($CH_2$—$CH_2$—O—$CH_2$—$CH_2$)—).

The term "prepreg" as used herein refers to a reinforcing fabric that has been pre-impregnated with a resin system.

In one aspect, the present invention provides compounds having a structure defined by Formula (I):

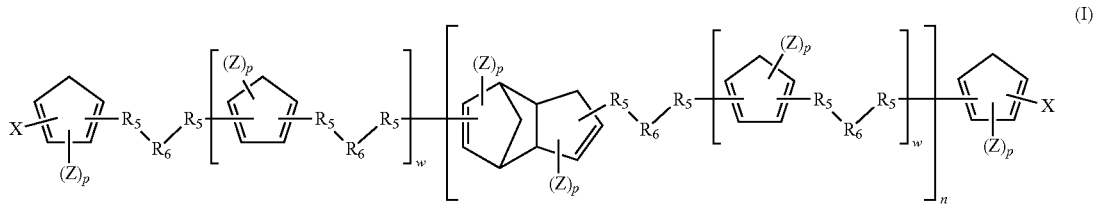

wherein:
(a) each $R_5$ is independently a methylene group ($CH_2$), or a methylene group substituted with one or more —H, —$CH_3$, or halogen functionalities;
(b) each $R_6$ is independently a bond or a straight-chain or branched, linear or cyclic, saturated or unsaturated, substituted or unsubstituted, aliphatic or aromatic group having between 1 and 20 carbon atoms;
(c) each X is independently a functionality possessing at least one non-aromatic alkene, alkyne, $CH_3$—$(CH_2)_n$— (where n=0 to 12), or an aromatic moiety;
(d) each Z is independently either H or X, and each p is independently an integer from 1-4;
(e) each w is independently 0, or an integer greater than or equal to 1; and
  i. when w is 0, the bracket region represents a bond and n is 0, or an integer greater than or equal to 1; and
  ii. when n is 0, the bracket region represents a bond.

In some embodiments of Formula (I), the value of w is equal to zero, representing a bond between the $R_5$ group and the cyclopentadiene or dicyclopentadiene. These compounds of Formula (I) may be defined by Formula (II):

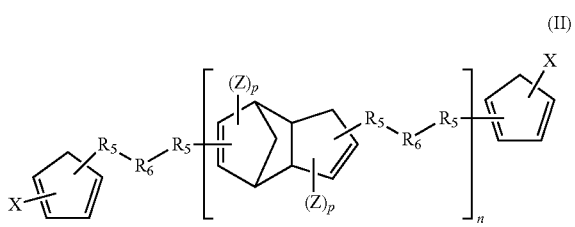

(II)

In some embodiments, each $R_5$ group in the compound of Formula (I) is the same.
In some embodiments, each $R_6$ group in the compound of Formula (I) is the same.
In some embodiments, each X group in the compound of Formula (I) is the same.
In some embodiments, the compound of Formula (I) may contain more than one independently defined $R_5$ groups.
In some embodiments, the compound of Formula (I) may contain more than one independently defined $R_6$ groups.
In some embodiments, the compound of Formula (I) may contain more than one independently defined X group.
In some embodiments, $R_5$ is a methylene (—$CH_2$—) group.
In some embodiments, X is selected from the group consisting of vinylbenzyl, propenylbenzene, ethenylbenzene, (methyl)ethenylbenzene, styrenyl, allyl, propargyl, or butenyl group.
In some embodiments, X is a vinylbenzyl, propenylbenzene, ethenylbenzene, (methyl)ethenylbenzene, or styrenyl group.
In some embodiments, X is an allyl, propargyl, or butenyl group. In other embodiments, X is an allyl group.
In some embodiments, X is an alkenyl or alkynyl group between 1 and 20 carbons in length, possessing at least one unit of unsaturation, including alpha-olefin groups.
In some embodiments, X has a structure selected from the group consisting of:

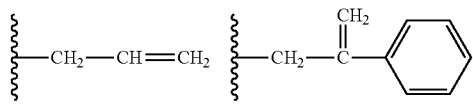

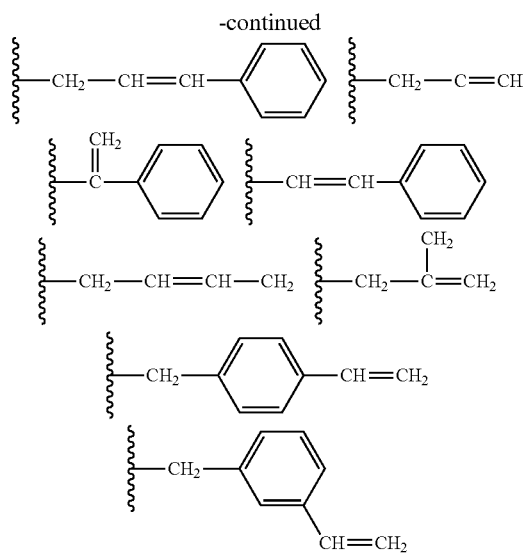

and isomers thereof.
In some embodiments, X is an aliphatic group included but not limited to $CH_3(CH_2)_n$ group where n=0 to 12, a benzyl group, or naphthyl group.
In some embodiments, $R_6$ is an aryl group including but not limited to phenyl, napthyl, anthryl, and biphenyl. In other embodiments, $R_6$ is an aryl group including but not limited to phenyl or biphenyl.
Each $R_6$ is independently a bond or a straight-chain or branched, linear or cyclic, saturated or unsaturated, substituted or unsubstituted, aliphatic group having between 1 and 20 carbon atoms. In some embodiments, $R_6$ is a linear aliphatic chain substituted with one or more aliphatic groups. In some embodiments, $R_6$ contains a saturated or unsaturated cycloaliphatic group. In some embodiments, $R_6$ is a cyclohexyl or cyclohexenyl group.
In some embodiments, $R_6$ is an alkyl group including but not limited to —$(CH_2)_y$— where y=1 to 20. In other embodiments, $R_6$ is an alkyl group including but not limited to —$(CH_2)_y$— where y=1 to 12. In other embodiments, $R_6$ is an alkyl group including but not limited to —$(CH_2)_y$— where y=1 to 4.
In some embodiments, $R_6$ is an alkenyl group between 2 and 20 carbons in length possessing at least one carbon-carbon double bond. In some embodiments, $R_6$ is an alkenyl group between 2 and 10 carbons in length possessing at least one carbon-carbon double bond. In some embodiments, $R_6$ is an alkenyl group between 2 and 5 carbons in length possessing one carbon-carbon double bond. In some embodiments, $R_6$ is

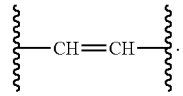

In some embodiments, $R_6$ is an alkynyl group between 2 and 20 carbons in length, possessing at least one carbon-carbon triple bond. In some embodiments, $R_6$ is an alkynyl group between 2 and 10 carbons in length possessing at least one carbon-carbon triple bond. In some embodiments, $R_6$ is an alkynyl group between 2 and 5 carbons in length possessing one triple bond. In some embodiments, $R_6$ is

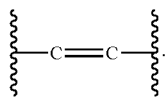

In some embodiments, $R_6$ is a bond.

In some embodiments, $R_5$ is a methylene group and $R_6$ is a bond, such that the —$R_5$-$R_6$-$R_5$—unit is equivalent to ethylene, or —$(CH_2)_2$—. In some embodiments, $R_5$ is a methylene group and $R_6$ is —$(CH_2)_y$— where y=1, such that the —$R_5$-$R_6$-$R_5$—unit is equivalent to propylene, or —$(CH_2)_3$—. In some embodiments, $R_5$ is a methylene group, and $R_6$ is —$(CH_2)_y$— where y=2, such that the —$R_5$-$R_6$-$R_5$—unit is equivalent to a butylene, or —$(CH_2)_4$—. In some embodiments, $R_5$ is a methylene group, and $R_6$ is —$(CH_2)_y$— where y=4, such that the —$R_5$-$R_6$-$R_5$—unit is equivalent to a hexylene, or —$(CH_2)_6$—.

In some embodiments, $R_5$ is a methylene group, and $R_6$ is phenyl such that the —$R_5$-$R_6$-$R_5$—unit is equivalent to xylyl, or

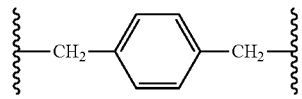

and isomers thereof.

In some embodiments, $R_5$ is a methylene group, and $R_6$ is naphthyl such that the —$R_5$-$R_6$-$R_5$—unit is equivalent to dimethylnaphthalene, or

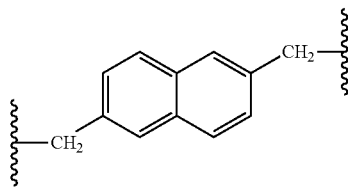 [SMILES: *Cc1ccc2cc(C*)ccc2c1]

and isomers thereof.

In some embodiments, $R_5$ is a methylene group and $R_6$ is anthryl such that the —$R_5$-$R_6$-$R_5$-unit is equivalent to dimethylanthracene, or

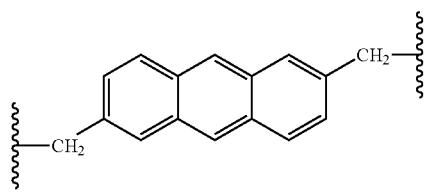 [SMILES: *Cc1ccc2cc3cc(C*)ccc3cc2c1]

and isomers thereof.

In some embodiments, $R_5$ is a methylene group, and $R_6$ is biphenyl such that the —$R_5$-$R_6$-$R_5$—unit is equivalent to dimethylbiphenyl, or

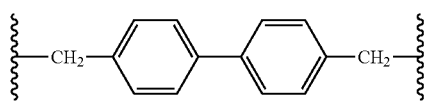 [SMILES: *Cc1ccc(-c2ccc(C*)cc2)cc1]

and isomers thereof.

In some embodiments, resins of Formula (I) or Formula (II) may be further oligomerized by thermal processes, with or without an added catalyst. Alternately, in some embodiments, resins of Formula (I) or Formula (II) may be further oligomerized by ultraviolet-light processes, with or without an added catalyst.

In one aspect of the present disclosure are resins, including resins defined by Formula (I). In another aspect of the present disclosure are compositions comprising mixtures of the resins defined by Formula (I). For example, a composition may comprise a first resin of Formula (I) and a second resin of Formula (I), wherein the first and second resins differ in at least one substituent or moiety or in the number of any repeating groups. Of course, the skilled artisan will appreciate that any composition may comprise any number of resins of Formula (I), and any of the different resins may be present in the same or differing amounts within the composition. By way of a further example, a composition may comprise a first resin of Formula (I), a second resin of Formula (I), and a third resin of Formula (I), wherein each of the first, second, and third resins differ in at least one substituent or moiety or in the number of any repeating groups, and where the first resin is present in an amount ranging from between about 1% to about 99% by weight of the composition, the second resin is present in an amount ranging from 1% to about 99% by weight of the composition, and the third resin constitutes the remainder of the composition by weight of the composition.

When it is denoted that any of the resins of Formula (I) may differ from one another, it is meant that the resins may differ (i) in any moiety constituting the resin; (ii) the number of any of the repeat groups of the moiety that are present, (iii) the positioning of any moiety along any cyclic or aromatic group; and/or (iv) isomeric or stereochemical differences between the various moieties and/or groups.

In some embodiments, resins of Formula (I) may contain more than one independently defined $R_6$ groups. In some embodiments, resins of Formula (I) may contain more than one independently defined X group.

As used herein, the terms "cyclopentadiene-based ring" or "cyclopentadiene" (used interchangeably herein) is not limited to cyclopentadiene, but includes derivatives of cyclopentadiene, i.e. those containing substituents other than hydrogen, or those capable of being substituted with X and/or $R_5$ groups as defined in Formula (I). By way of example, "cyclopentadiene rings" may encompass cyclopentadiene and cyclopentadiene substituted with one or more $C_1$ to $C_4$ straight-chain or branched alkyl groups.

The skilled artisan will appreciate that the functionalities on the cyclopentadiene ring, i.e., X and $R_5$ groups in Formula (I), may be in any position along each cyclopentadiene ring. The skilled artisan will also appreciate that any of the functionalities may be located on the same or different positions in each cyclopentadiene ring. For example, one cyclopentadiene ring of a resin of Formula (I) may comprise an X group at a first ring position (e.g., one carbon away from the carbon bearing the $R_5$ group) while another cyclopentadiene ring of a resin of Formula (I) may comprise a X group at a second or third ring position (e.g., two or three carbons away from the carbon bearing the $R_5$ group). Likewise, and again by way of example, one cyclopentadiene ring of a resin of Formula (I) may comprise an X group at a first ring position (e.g., one carbon away from the carbon bearing the —$CH_2$— group) while another cyclopentadiene ring of a resin of Formula (I) may comprise an X group at a second or third ring position (e.g., two or three carbons away from the carbon bearing the —CH$_2$— group).

In embodiments of Formula (I) where w>0, there will be cyclopentadiene rings that are end-groups (possessing at least one X group and at least one R$_5$ group), and there will be cyclopentadiene rings that are internal (possessing at least two R$_5$ groups). By way of example, the end-group cyclopentadiene rings possess the structure:

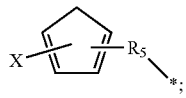

whereas internal cyclopentadiene rings possess the structure:

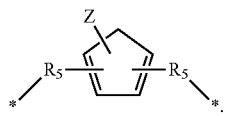

By definition, end-group cyclopentadiene rings possess at least two functionalities: at least one X group and one R$_5$ group. By definition, internal cyclopentadiene rings possess at least two functionalities: at least two independent R$_5$ groups, and may also possess an X group in embodiments where Z is equal to X.

By way of example, the substitution patterns of functionalities on each bi-functional cyclopentadiene ring of compounds of Formula (I) may be represented by any or all of the following structures:

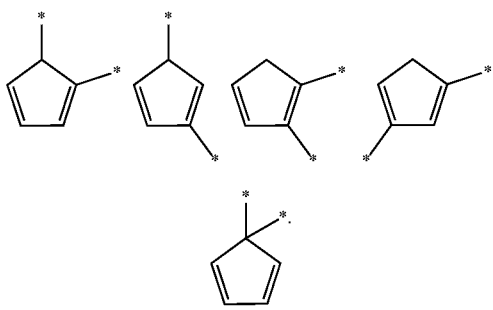

Likewise, by way of example, the substitution patterns of functionalities on each tri-functional cyclopentadiene ring of compounds of Formula (I) may be represented by any or all of the following structures:

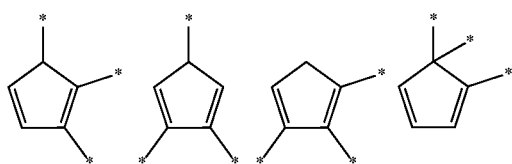

-continued

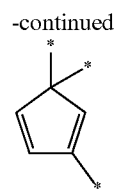

The skilled artisan will appreciate that the substitution pattern of each cyclopentadiene ring within a resin of Formula (I) may have a different arrangement of substituents, independent of the substitution patterns at any other cyclopentadiene ring within the same or different compound of Formula (I).

The skilled artisan will appreciate that although the invention is defined by compounds featuring end-group cyclopentadiene rings bearing one R$_5$ group and at least one X group, the nature of the synthesis may generate complicated mixtures that feature some percentage of cyclopentadiene rings bearing 1) multiple R$_5$ groups and no X groups, 2) multiple X groups with no R$_5$ groups, and/or 3) three or more R$_5$ groups or X groups.

As used herein, the term "dicyclopentadiene" is not limited to dicyclopentadiene but includes derivatives of dicyclopentadiene, i.e., those containing substituents other than hydrogen or those capable of being substituted with X and/or R$_5$ groups as defined in Formula (I). By way of example, "dicyclopentadiene group" may encompass dicyclopentadiene and dicyclopentadiene substituted with one or more C$_1$ to C$_4$ straight-chain or branched alkyl groups.

The skilled artisan will appreciate that the substitution patterns of functionalities on the dicyclopentadiene groups may likewise be variable. As the dicyclopentadiene groups are formed via the reaction of two disubstituted cyclopentadiene rings of variable substitution patterns, a large number of substitution patterns are possible. By way of example, the substitution patterns of functionalities on each dicyclopentadiene unit of compounds of Formula (I) may be represented by any or all of the following structures:

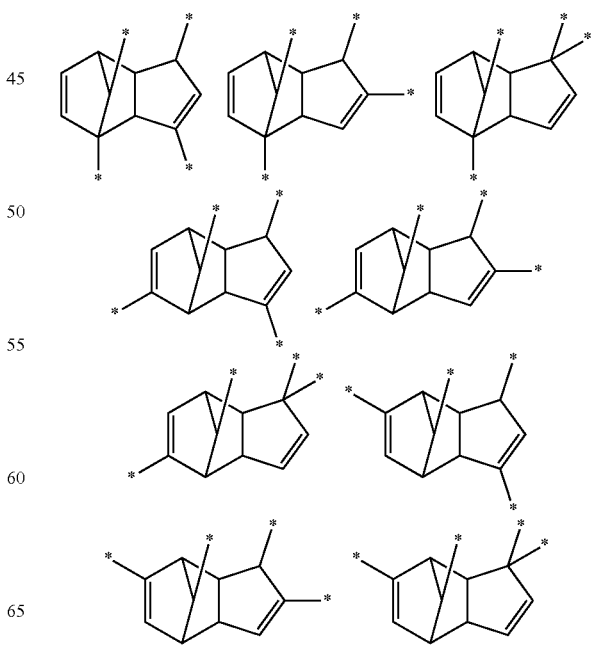

-continued

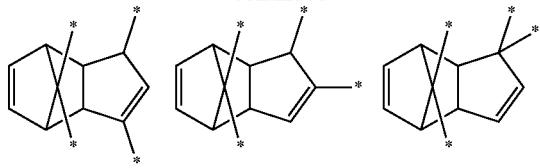

The substitution patterns presented in these diagrams are non-limiting and do not represent the full range of possible substitution patterns that are possible in compounds of Formula (I).

In some embodiments, a polymer is provided, the polymer being derived from one or more resins of Formula (I) (or any like resin disclosed herein). In some embodiments, the polymer further comprises an additive selected from the group consisting of adhesion agents, peroxides/crosslinking agents, antioxidants, flame retardants, diluents and fillers.

In some embodiments, a copolymer is provided, the copolymer derived from a first resin of Formula (I) and a second resin of Formula (I), wherein the first and second resins are different. In some embodiments, an interpenetrating polymer network is provided, the interpenetrating polymer network derived from a first resin of Formula (I) and a second resin of Formula (I), wherein the first and second resins are different.

In some embodiments, a copolymer or an interpenetrating polymer network is provided, the copolymer or the interpenetrating polymer network being derived from a resin of Formula (I), and a second component that differs from the resin of Formula (I). In some embodiments, the second component is selected from the group consisting of polyethylenes, polypropylenes, polybutylenes, low vinyl polybutadienes, high vinyl polybutadienes, polystyrenes, butadiene-styrene copolymers, styrene-maleic anhydride (SMA) polymers, acrylonitrile-butadiene-styrene (ABS) polymers, polydicyclopentadienes, epoxies, polyurethanes, cyanate esters, poly(phenylene oxide), ethylene-propylene-diene monomer (EPDM) polymers, cyclic olefin copolymers (COC), polyimides, bismaleimides, phosphazenes, olefin-modified phosphazenes, acrylates, vinyl esters, polylactones, polycarbonates, polysulfones, polythioethers, polyetheretherketones (PEEK), polydimethylsiloxanes (PDMS), polyethylene terephthalates (PET), and polybutylene terephthalates (PBT), and other commercially-available polymers. In some other embodiments, the second component is selected from the group consisting of styrene, divinylbenzene, 1,2-bis(vinylphenyl)ethane, vinylbenzyl ether compounds, vinyl ether compounds, allyl ether compounds, vinylphenyl monomers, vinyl monomers, allyl monomers, or derivatives of such components. Suitable components include, but are not limited to, vinyl-functionalized cyanate ester HTL-300 (available from Lonza Chemicals), low- and high-vinyl Ricon polybutadienes (Total/Cray Valley), butadiene-styrene Ricon copolymers (Total/Cray Valley), Sartomer acrylate monomers (Arkema), olefin-containing phosphazene SPV-100 (Otsuka Chemicals), bismaleimide BMPI-300 (Lonza Chemicals), bismaleimide Cycom 5250 (Cytec Solvay), bismaleimide BMI-1700 (Designer Molecules Inc.), bismaleimide BMI-3000 (Designer Molecules, Inc.), bismaleimide BMI-689 (Designer Molecules, Inc.), bismaleimide Homide 250 (HOS-Technik GmbH), bismaleimide BMI-2300 (Daiwakaskei Industry Co., LTD), bismaleimide BMI-TMH (Daiwakaskei Industry Co., LTD), bismaleimide Compimide 353A (Evonik), bismaleimide Compimide C796 (Evonik), methacrylate-functionalized polyphenylene ether SA9000 (Sabic, Saudi Basic Industries Corporation), functionalized phenylene ether oligomers OPE-2EA and OPE-2St (MGC, Mitsubishi Gas Company), polyimide PETI 330 (UBE Industries, Ltd), Vinyl-ester resins Advalite 35070-00 (Reichhold), epoxy resins Celloxide 8000 and Celloxide 2021P (Daicel) or Araldite MY 721 and GY 281 and GY 240 (Huntsman).

Resin compositions of the present disclosure can be used as isolated or in blends with other copolymers, adhesion agents, peroxides/crosslinking agents, antioxidants, flame retardants, diluents and other additives or fillers known in the art.

As will be appreciated by those of ordinary skill in the art, the resins disclosed herein may be blended with other polymers. Such other polymers may be reactive such that they are copolymerized with the resin compositions of the present disclosure to form random or block copolymers. Alternately such other polymers may be formed by alternate means such that an interpenetrating polymer network or polymer phase dispersion is formed. Such other polymers include but are not limited to polyethylenes, polypropylenes, polybutylenes, low vinyl polybutadienes (predominantly 1,3 addition), high vinyl polybutadienes (significant 1,2 addition), polystyrenes, butadiene-styrene copolymers, SMA polymers (styrene maleic anhydride polymers), ABS polymers (acrylonitrile butadiene styrene polymers), polydicyclopentadienes, epoxies, polyurethanes, cyanate esters, poly (phenylene oxide), EPDM polymers (polymers derived from ethylene propylene diene monomers), cyclic olefin copolymers (COC), polyimides, bismaleimides, phosphazenes, olefin-modified phosphazenes, acrylates, vinyl esters, polylactones, polycarbonates, polysulfones, polythioethers, polyetheretherketones (PEEK), polydimethylsiloxanes (PDMS), polyethylene terephthalates (PET), polybutylene terephthalates (PBT), and other commercially-available polymers. Such polymers may be optionally modified or functionalized as desired.

Additional comonomers include but are not limited to the group consisting of styrene, divinyl benzene, vinyl toluene, methyl styrene, tert-butyl styrene, alpha-methyl styrene, alpha-methyl styrene dimer, vinyl cyclohexene, ethylidene norbornene, vinyl norbornene, alpha-pinene, beta-pinene, limonene, other terpenes, polybutadienes, modified polybutadienes, polystyrenes (homopolymer and block-copolymers), modified polystyrenes, polyterpenes, other vinyl-reactive monomers, and reactive dimers/oligomers/polymers/copolymers thereof.

In some embodiments, the resins disclosed herein may be blended with an electrical property modifier. Examples of the electrical property modifier may include cyanate ester derived compounds and bismaleimide triazine copolymers. A cyanate ester derived compound broadly refers to a chemical substance generally based on a bisphenol or novolac derivative, in which the hydrogen atom of at least one hydroxyl group of the bisphenol or novolac derivative is substituted by a cyanide group. Therefore, a cyanate ester derived compound generally has an —OCN group. In some implementations, a cyanate ester derived compound may refer to, without limitation, 4,4'-ethylidenebisphenylene cyanate, 4,4'-dicyanatodiphenyl, 2,2-bis(4-cyanatophenyl) propane, bis(4-cyanato-3,5-dimethylphenyl)methane, bis(4-cyanatophenyl)thioether, bis(4-cyanatophenyl)ether, pre-polymer of bisphenol A dicyanate in methyl ethyl ketone, 1,1-bis(4-cyanatophenyl)ethane, 1,1-bis(4-cyanatophenyl) methane, 1,3-bis(4-cyanatophenyl-1-(methylethylidene)) benzene, bis(4-cyanatophenyl)ether, bis(4-cyanatophenyl)-2,2-butane, 1,3-bis [2-(4-cyanato phenyl)propyl]benzene, tris(4-cyanatophenyl)ethane, cyanated novolac, and cyanated phenoldicyclopentadiene adduct.

Resins of the present disclosure may be blended with various additives and adhesion agents to improve resin adhesion and compatibility with reinforcement substrates such as glass, carbon or aramid fibers. Suitable adhesion-promoting additives include but are not limited to maleic anhydride, styrene maleic anhydrides, functionalized tri-alkoxysilanes, maleic anhydride-grafted polyolefins, as well as other polymers previously detailed in this disclosure that are capable of improved substrate adhesion.

Resin compositions of the present disclosure may be cured into a solid material by self-polymerization reactions at elevated temperatures or by the action of added catalysts. Suitable catalysts include radical initiators and Lewis acid catalysts. Suitable Lewis acid catalysts include but are not limited to cationic thermal acid generators, cationic photo-acid generators, or other Lewis acid catalysts, including but not limited to transition metal complexes, boron compounds, aluminum compounds, titanium compounds, or tin compounds.

Suitable radical initiators include but are not limited to dialkyl peroxides, diacyl peroxides, and azo compounds. Particularly suitable radical initiators include dicumyl peroxide and 2,5-Dimethyl-2,5-di-(tert-butylperoxy)hexyne-3 (Trigonox 145-E85). Radical initiators may be added at any level suitable to effect sufficient polymerization, ranging from ppm levels to 5 wt % depending on initiator used. Radical initiators may be combined with other radical initiators or other classes of suitable catalysts as desired to affect the polymerization.

Thermal acid generators and photo-acid generators produce strong acids upon activation at elevated temperature or upon absorption of specific energy wavelengths. Suitable thermal acid generators and photo-acid generators include onium salts such as iodonium and sulfonium salts. Suitable catalysts include but are not limited to diaryliodonium compounds or triarylsulfonium compounds paired with anions such as $BF_4^-$, $B(C_6F_5)_4^-$, $PF_6^-$, $AsF_6^-$, $SbF_6^-$ and variations thereof. Other suitable Lewis acid catalysts include boron compounds, aluminum compounds, titanium compounds, tin compounds and compounds of transition metals known in the art. Particularly suitable Lewis acid initiators include bis(4-dodecylphenyl)iodonium hexafluoroantimonate such as SpeedCure 937 available from Arkema, bis-(4-t-butylphenyl)-iodonium hexafluorophosphate such as SpeedCure 938 available from Arkema, 4-isopropyl-4'-methyldiphenyliodonium tetrakis(pentafluorophenyl)borate such as SpeedCure 939 available from Arkema, and (sulfanediyldibenzene-4,1-diyl)bis(diphenylsulfonium) bis(hexafluoroantimonate) such as SpeedCure 976s available from Arkema and stannous octoate such as Reaxis C129 available from Reaxis. Lewis acid initiators may be added at any level suitable to effect sufficient polymerization, ranging from ppm levels to 5 wt %, depending on the initiator used. Lewis acid initiators may be combined with other Lewis acid initiators or other classes of suitable catalysts as desired to affect the polymerization.

Resin compositions of the present disclosure can be cured into a solid material at temperatures ranging from about 120° C. to about 250° C. for between about 30 minutes and about 240 minutes. In some embodiments, the resin compositions may be cured into a solid material at temperatures ranging from about 150° C. to about 220° C. for between about 60 minutes and about 180 minutes. The disclosure can then optionally be heated to higher temperatures for additional polymer curing as desired. In some embodiments, the resins of this disclosure, when fully cured, generate solid thermoset materials that possess glass transition temperatures (Tg) greater than 100° C. In some embodiments, the resins of this disclosure, when fully cured, generate solid thermoset materials that possess glass transition temperatures (Tg) greater than 150° C. In some embodiments, the resins of this disclosure, when fully cured, generate solid thermoset materials that possess glass transition temperatures (Tg) greater than 200° C. In some embodiments, the resins of this disclosure, when fully cured, generate solid thermoset materials that possess glass transition temperatures (Tg) ranging from about 100° C. to about 400° C. In yet other embodiments, the resins of this disclosure, when fully cured, generate solid thermoset materials that possess glass transition temperatures (Tg) ranging from about 125° C. to about 400° C. In yet other embodiments, the resins of this disclosure, when fully cured, generate solid thermoset materials that possess glass transition temperatures (Tg) ranging from about 175° C. to about 400° C.

Mechanical properties of the polymerized resin compositions of the present disclosure may be modified by the incorporation of crosslinking agents. Such crosslinking agents include but are not limited to triallyl cyanurate, triallyl isocyanurate, polybutadiene dimethacrylates, polybutadiene diacrylates, divinylbenzene, 1,2-bis(vinylphenyl)ethane, vinylbenzyl ether compounds, vinyl ether compounds, allyl ether compounds, vinylphenyl monomers, vinyl monomers, allyl monomers, and similar compounds containing two or more carbon-carbon bond forming moieties per molecule.

Resin compositions of the present disclosure may be blended with solvents prior to polymerization, if desired, for certain applications. Any solvent known by one with skill in the art to be useful in conjunction with resin composition can be used. Particularly useful solvents include methyl ethyl ketone (MEK), xylene, toluene, DMF, and mixtures thereof. In some embodiments, the solvents are selected from MEK or toluene. When used, solvents are present in the resin composition in the amount ranging from about 1% to about 99% by weight of the composition. In other embodiments, solvents are present in the resin composition in an amount ranging from between about 10% and about 60% by weight of the composition. In other embodiments, solvents are present in the resin composition in an amount ranging from between about 15% and about 30% by weight of the composition. In yet other embodiments, solvents are present in the resin composition in an amount ranging from between about 20% to about 25% by weight of the composition. Such solvent-blended resin compositions of the present disclosure are most useful for the production of prepreg-style reinforcement layers.

The thermosetting resin compositions of the present disclosure may additionally be formulated with other standard antioxidants, flame retardants, fillers, diluents, stabilizers, processing aids and other additives as are commonly used in such applications. Such additives include, but are not limited to, phenolic antioxidants, dielectric fillers, and commercial flame retardants. Most commercial flame retardants are suitable for use with resins of the present disclosure. Suitable flame retardants also include phosphazenes and olefin-modified phosphazenes. Also, resin laminates made from resin composition can be made V0 without halogenated flame retardant using reactive phosphorus flame retardants such as (vinyl or other radical-reactive FR), as well as non-reactive phosphorus flame retardants.

Applications

The thermosetting resin compositions of the subject disclosure may also be used to provide prepregs with and without tack. The compositions are particularly useful in the preparation of high Tg laminates having ultra-low dielectric constants and ultra-low dielectric loss. These electrical properties help solve signal speed and signal integrity problems encountered with high-speed analog and digital circuitry applications. The thermosetting resin compositions of the subject disclosure are useful for making prepregs in a continuous process with and without solvent. The viscosity of the inventive compositions can be adjusted for hot/melt prepreg and present substantial cost savings for prepreg production. Prepregs are generally manufactured using a reinforcement material including but not limited to woven glass, carbon, Kevlar, spectra, aramid or quartz fibers. The thermosetting resin composition of the present disclosure may also be coated directly to any polymeric film for build-up PCB. Thermosetting resin compositions of the present disclosure may also be directly coated to copper using slot-die or other related coating techniques for resin-coated copper (RCC). The prepreg materials made from thermosetting resins of the present disclosure can also be converted to laminates. The lamination process typically follows the stack-up of one or more prepreg layers between one or more sheets of conductive foil, such as copper foil. This process is often described as copper-clad laminates (CCL) and is generally well-known to persons with ordinary skill in the art. Pressure and temperature applied to the prepreg stack result in the formation of laminates. The laminates produced from the present disclosure exhibit high Tg. It is also possible to generate compositions of the present disclosure that produce laminates of moderate Tg (>150° C.) with considerable flexibility. Flexible laminates are very useful for various bendable electronic devices. Thermosetting resins of the present disclosure with sufficiently low viscosities may also be used for vacuum infusion applications, where reinforcement materials as previously defined are impregnated with resin formulations of the present disclosure by the action of vacuum pressure. Resins of the present disclosure with sufficiently low viscosities may be used in solvent-less or environmentally friendly manufacturing techniques for various applications. Resins of the present disclosure may also be used in 3D printing applications, including continuous liquid interface printing (CLIP) and stereolithography (SLA) applications.

Such combinations allow for improved surface adhesion performance in coatings, adhesives, composites and laminates.

Resins of Formula (I) may additionally be used as additives, reactive diluents, or copolymers for commercial polymers used in electronic applications, providing improvements in resin viscosity and dielectric properties. In some embodiments, resins of Formula (I) may be combined with resins based on cyanate esters, epoxies, bismaleimides, or polyolefins to generate blends with improved manufacturing properties, mechanical performance, or electrical performance.

In another aspect of the present disclosure are kits comprising any of the resins, polymers, blends, etc. disclosed herein. In some embodiments, the resins, polymers, blends, etc., are mixed with a suitable solvent. In some embodiments, the kits comprise multiple resins, polymers, blends, etc., where each of the resins, polymers, blends, etc., are provided in a separate container. In some embodiments, the kits include a resin and other reactants, reagents, or solvents. In some embodiments, the kits further comprise instructions.

For example, a kit may include a resin of any of Formula (I) and also may include a bis-maleimide, such that the resin and the bis-maleimide may be reacted to form a product. Any bismaleimides may be included in a kit, including any of those recited herein. In some embodiments, the kit includes a bis-maleimide selected from the group consisting of 1,6'-bismaleimide-(2,2,4-trimethyl)hexane, 4,4'-Diphenylmethanebismaleimide, Polyphenylmethanebismaleimide, N,N'-(4-methyl-m-phenylene)-bismaleimide, N,N'-m-phenylenebismaleimide, bisphenol A diphenyl ether bismaleimide, 3,3'-dimethyl-5,5'-diethyl-4,4'-diphenylmethane bismaleimide, N,N'-[Methylenebis(2,6-diethyl-4,1-phenylene)]bis(maleimide), N,N'-[Methylenebis(2-isopropyl-6-methyl-4,1-phenylene)]bis(maleimide), 1,2-bis(maleimido)ethane, 1,4-bis(maleimido)butane, and 1,6-bis(maleimido)hexane.

In some embodiments, a kit may include a resin of any of Formula (I) and also may include a crosslinking agent, such as a crosslinking agent selected from the group consisting of triallyl cyanurate, triallyl isocyanurate, polybutadiene dimethacrylates, polybutadiene diacrylates, divinylbenzene, 1,2-bis(vinylphenyl)ethane, vinylbenzyl ether compounds, vinyl ether compounds, allyl ether compounds, vinylphenyl monomers, vinyl monomers, and allyl monomers.

The resins, reaction products, blends, polymers, compositions, etc., described herein may be utilized in any suitable application. For example, the resins, reaction products, blends, polymers, compositions, etc., may be used as a substrate onto which other materials may be applied. In some embodiments, resins, reaction products, blends, polymers, compositions, etc., may be applied as films onto the surface of another substrate, or a laminate may be produced from the resins, reaction products, blends, polymers, compositions, etc. disclosed herein.

In some embodiments, the resins, reaction products, blends, polymers, compositions, etc. disclosed herein may be used in the manufacture of printed circuit boards or for general use in any electronic device. In other embodiments, resins, reaction products, blends, polymers, compositions, etc., disclosed herein may be used in copper-clad laminates (CCL), high density interconnect substrates, or integrated circuits. In other embodiments, resins, reaction products, blends, polymers, compositions, etc., disclosed herein may be used in radomes, antennas (e.g., cellular phone antennas, satellite phone antennas, antennas for 5G communication devices, etc.), or in radar structures. In yet other embodiments, the resins, reaction products, blends, polymers, compositions, etc., disclosed herein may be used as part of an underfill adhesive composition. In further embodiments, the resins, reaction products, blends, polymers, compositions, etc., disclosed herein may be used in cellular base stations, wireless base stations, modems, and routers. In yet other embodiments, the resins, reaction products, blends, polymers, compositions, etc., disclosed herein may be used in radio frequency identification tags and other sensors. In yet other embodiments, the resins, reaction products, blends, polymers, compositions, etc., disclosed herein may be used in microwave communication systems. In yet other embodiments, the resins, reaction products, blends, polymers, compositions, etc., disclosed herein may be used communications and network servers. In yet other embodiments, the resins, reaction products, blends, polymers, compositions, etc., disclosed herein may be used in backplanes.

The following examples are provided to more completely describe the invention described herein. The specific techniques, conditions, materials, proportions and reported data set forth to illustrate the principles and practice of the invention are exemplary only and should not be construed as limiting the scope of the invention.

EXAMPLES

Materials:

Cyclopentadiene was isolated by thermal cracking of dicyclopentadiene (Ultrene 97 from Cymetech Corporation) at temperatures of 150-200° C. per literature methods. Allyl chloride, 1,4-dichlorobutane, α,α'-dichloroxylene, and dicumyl peroxide were obtained from Sigma Aldrich and used as received. 1,6-Dichlorohexane was obtained from Evonik and used as received. 1,2-Dichloroethane was obtained from Occidental Chemical Company and used as received. Methyl tributyl ammonium chloride aqueous solution (75 wt %) was obtained from Sachem, Inc. Potassium hydroxide flake was obtained from Chengdu Huarong Chemical and used as received. K-Pure catalysts were obtained from King Industries Specialty Chemicals. Speed-Cure catalysts were obtained from Lambson Limited/Arkema. Reaxis catalysts were obtained from Reaxis Inc. Deuteron catalysts were obtained from Deuteron GmbH. Manganese Octanoate was obtained from Pfaltz & Bauer. Benzyl chloride was obtained from Valtris and used as received.

Example 1: Bis(Allylcyclopentadienyl)Butane 79.27 g of freshly-distilled cyclopentadiene was added to 514.86 g of 50 wt % aqueous KOH solution with 11.66 g of methytributylammonium chloride aqueous solution (75 wt %). This mixture was stirred at 400 RPM for 30 minutes to establish cyclopentadienide concentration. This solution was cooled to 4° C., and 76.56 g of 1,4-dichlorobutane was added, and over the 10 minutes, the reaction temperature rose to 92° C. The reaction cooled to 44° C. in an ice bath over 5 min, and the solution was removed from the ice bath and allowed to stir for 1 hour, and the stirring increase to 600 RPM.

After 1 hour, the reaction was cooled to 8° C., and 91.88 g of allyl chloride was added over 10 min, and the reaction temperature increased to 26° C. An additional 423.64 g of 50 wt % KOH solution was then added, and the reaction was heated to 40° C. and stirred for 3 hours.

1 L of water was added to the reaction, and the aqueous layer was removed. The organic was washed 3 times with water, and 300 mL of xylenes was added. This mixture was washed once with dilute HCl followed by one additional water wash and then dried over sodium sulfate, filtered and the solvent removed using a rotary evaporator at 15 torr and 80° C. to give a non-viscous orange liquid resin.

Example 2: bis(allylcyclopentadienyl)butane-dicyclopentadiene-oligomer

The recovered orange non-viscous resin of Example 1 was heated at 160° C. for 2 hours and 180° C. for 5 hours to obtain an orange viscous liquid.

Example 3: bis(allylcyclopentadienyl)hexane 760 g of 50 wt % KOH was flushed with $N_2$ for 15 min in a 2 L glass reactor. 150 g of freshly distilled cyclopentadiene and 21.2 g of methyltributylammonium chloride aqueous solution (75 wt %) were added, and the mixture was stirred at room temperature for 30 min at 400 RPM to form cyclopentadienide. After 30 min, an ice water bath was added, and 211 g of 1,6-dichlorohexane was added portionwise over 60 minutes, maintaining the reaction temperature below 25° C. After the final addition, the reaction stirred at 7° C. for another 60 min. The reaction was then heated to 55° C. with hot water and stirred for an additional 60 min. The reaction was then cooled to 31° C., and 173 g of allyl chloride was added, which increased the reaction temperature to 43° C., at which point a water bath was added to maintain the temperature below 43° C. This reaction was stirred for an additional 60 min, after which 500 mL of distilled water was added, and the aqueous layer was removed via siphon. 600 g of fresh 50 wt % KOH was then added, and the reaction temperature spiked to 48° C. This reaction was then stirred for 2 days at 460 RPM. The reaction was then heated to 70° C. for 1 hour, and then 500 g of $H_2O$ was added, and the aqueous layer removed by siphon. The organic was transferred to a separatory funnel and washed 3 times with water. The organic layer was diluted with hexanes dried over 50 g of $Na_2SO_4$, filtered over basic alumina, and 0.334 g of freshly ground tert-butyl catechol was added. The solvent was removed via rotary evaporation for 1.5 hours at 60° C. at 11 torr to give an orange non-viscous liquid.

Example 4: bis(allylcyclopentadienyl)hexane-dicyclopentadiene-oligomer

The recovered orange non-viscous resin of Example 3 was then heated at 160° C. for 2 hours and 180° C. for 5 hours to obtain an orange viscous liquid.

Example 5: bis(allylcyclopentadienyl)ethane 96.36 g of freshly distilled cyclopentadiene was added to 491 g of 50 wt % aqueous KOH solution with 10.3 g of methyltributylammonium chloride aqueous solution (75 wt %). This mixture was stirred at 400 RPM for 30 min to establish cyclopentadienide concentration. This solution was cooled to 4° C., and 72.24 g of 1,2-dichloroethane was added, and over the 10 minutes, the reaction temperature rose to 92° C. The reaction cooled to 44° C. in an ice bath over 5 min and then stirred at 600 RPM at room temperature for 1 hour. After 1 hour, the reaction was cooled to 8° C., and 111.69 of allyl chloride was added over 10 min, and the reaction temperature increased to 26° C. An additional 423.64 g of 50 wt % KOH solution was then added, and the reaction was heated to 40° C. and stirred for 3 hours. 1 L of water was added to the reaction, and the aqueous layer was removed. The organic was washed 3 times with water, and 300 mL of xylenes was added. This mixture was washed once with dilute HCl followed by one additional water wash and then dried over sodium sulfate, filtered, and the solvent removed using a rotary evaporator at 15 torr and 80° C. to give a non-viscous orange liquid.

Example 6: bis(allylcyclopentadienyl)ethane-dicyclopentadiene-oligomer

The recovered orange non-viscous resin of Example 5 was then heated at 160° C. for 2 hours and 180° C. for 5 hours to obtain an orange viscous liquid.

Example 7: bis(allylcyclopentadienyl)xylylene 96.36 g of freshly distilled cyclopentadiene was added to 491 g of 50 wt % aqueous KOH solution with 10.3 g of methyltributylammonium chloride aqueous solution (75 wt %). This mixture was stirred at 400 RPM for 30 min to establish cyclopentadienide concentration. This solution was cooled to 4° C. and 127.79 g of α,α'-dichloroxylene was added as a 50 wt % solution in xylene, and over 10 minutes the reaction temperature rose to 92° C. The reaction cooled to 44 C in an ice bath over 5 min, and the reactor was removed from the ice bath and allowed to stir for 1 hour, and the stirring was increased to 600 RPM.

After 1 hour the reaction was cooled to 8° C. and 111.69 of allyl chloride was added over 10 min, and the reaction temperature was increased to 26° C. An additional 423.64 g of 50 wt % KOH solution was then added, and the reaction was heated to 40° C. and stirred for 3 hours. 1 L of water was added to the reaction, and the aqueous layer was removed. The organic was washed 3 times with water, and 300 mL of xylenes was added. This mixture was washed once with dilute HCl followed by one additional water wash and then dried over sodium sulfate, filtered and the solvent removed using a rotary evaporator at 15 torr and 80° C. to give a non-viscous orange liquid.

Example 8: bis(allylcyclopentadienyl)xylylene-dicyclopentadiene-oligomer

The recovered orange non-viscous resin of Example 7 was then heated at 160° C. for 2 hours and 180° C. for 5 hours to obtain an orange viscous liquid.

Example 9: mixed bis(allylcyclopentadienyl)xylylene and bis(allylcyclopentadienyl)ethane 145.0 g of freshly distilled cyclopentadiene was combined with 87.3 g α,α'-dichloroxylene, 49.3 g 1,2-dichloroethane, 152.6 g allyl chloride, and 18.8 g of methyltributylammonium chloride aqueous solution (75 wt %). This mixture was stirred at 400-600 RPM and cooled in an ice bath under a nitrogen atmosphere. 1,342.5 g aqueous KOH solution (50 wt %) was added dropwise to the stirred solution at a rate to moderate the exotherm. After all the KOH solution was added, the reaction was heated to 40° C. and stirred for 1 hour. 400 mL of water was added to the reaction, and the aqueous layer was removed. The organic was diluted with 200 mL xylenes and washed two times with 250 mL portions of aqueous NaHCO$_3$ (10 wt %), and the aqueous was removed. The organic was washed three times with 200 mL portions of water, and the aqueous was removed. The organic was dried over sodium sulfate, filtered, and the solvent removed using a rotary evaporator at 15 torr and 60° C. to give a non-viscous orange liquid.

Example 10: Mixed bis(allylcyclopentadienyl)xylylene-dicyclopentadiene- and bis(allylcyclopentadienyl)ethane-dicyclopentadiene-oligomer The recovered orange non-viscous resin of Example 9 was then heated at 150° C. for 3 hours to obtain an orange viscous liquid.

Example 11: mixed bis((allyl/benzyl)cyclopentadienyl)ethane 61.0 g of freshly distilled cyclopentadiene was combined with 45.0 g 1,2-dichloroethane, 57.5 g benzyl chloride, 34.9 g allyl chloride, and 9.0 g of methyltributylammonium chloride aqueous solution (75 wt %). This mixture was stirred at 200 RPM and cooled in an ice bath under nitrogen atmosphere. 600 g aqueous KOH solution (50 wt %) was added to the stirred solution at a rate to moderate the exotherm. After all KOH solution was added, the ice bath was removed, the stirring rate was increased to 450 RPM, and the reaction was heated to 57° C. for one hour. 700 mL of water was added to the reaction, and the aqueous layer was removed. The organic was washed with 500 g aqueous NaHCO$_3$ (10 wt %), and the aqueous was removed. The organic was washed three times with 500 mL portions of water, and the aqueous was removed. The organic was dried over sodium sulfate, filtered, and diluted with 25 g hexanes. The solvent was removed using a rotary evaporator at 11 torr and 40° C. to give a non-viscous orange liquid.

Example 12: mixed bis((allyl/benzyl)cyclopentadienypethane-dicyclopentadiene-oligomer The recovered orange non-viscous resin of Example 10 was then heated at 150° C. for 3 hours and 180° C. for 2 hours to obtain an orange viscous liquid.

Example 13: Mixed bis(allylcyclopentadienyl)xylylene and bis(allylcyclopentadienyl)butane 76.0 g of freshly distilled cyclopentadiene was combined with 36.3 g α,α'-dichloroxylene, 26.3 g 1,4-dichlorobutane, 63.4 g allyl chloride, and 7.9 g of methyltributylammonium chloride aqueous solution (75 wt %). This mixture was stirred at 250 RPM and cooled in an ice bath under a nitrogen atmosphere. 558 g aqueous KOH solution (50 wt %) was added dropwise to the stirred solution at a rate to moderate the exotherm, with the stirring rate increasing to 520 RPM. After all the KOH solution was added, the reaction was heated to 40° C. and stirred for 1 hour. 500 mL of water was added to the reaction, and the aqueous layer was removed. The organic was diluted with 200 g xylenes and washed two times with a total of 400 g of aqueous NaHCO$_3$ (10 wt %), and the aqueous was removed. The organic was washed three times with a total of 900 mL of water, and the aqueous was removed. The organic was dried over sodium sulfate, filtered, and the solvent removed via distillation under nitrogen at 150° C. to give a non-viscous orange liquid.

Example 14: Mixed bis(allylcyclopentadienyl)xylylene-dicyclopentadiene- and bis(allylcyclopentadienyl)butane-dicyclopentadiene-oligomer The orange non-viscous resin of Example 12 was heated at 150° C. for a total of 2 hours to obtain an orange viscous liquid.

Example 15: Mixed bis((allyl/benzyl)cyclopentadienyl)xylylene and bis((allyl/benzyl)cyclopentadienyl)ethane 145.0 g of freshly distilled cyclopentadiene was combined with 87.3 g α,α'-dichloroxylene, 49.3 g 1,2-dichloroethane, 63.1 g benzyl chloride, 114.4 g allyl chloride, and 18.8 g of methyltributylammonium chloride aqueous solution (75 wt %). This mixture was stirred at 400 RPM and cooled in an ice bath under a nitrogen atmosphere. 1200 g aqueous KOH solution (50 wt %) was added dropwise to the stirred solution at a rate to moderate the exotherm, with stirring rate increasing to 400 RPM. After all KOH solution was added, the reaction was heated to 35-40° C. and stirred for 1 hour.

400 mL of water was added to the reaction, and the aqueous layer was removed. The organic was diluted with 200 mL xylenes and washed two times with a total of 500 mL of aqueous NaHCO$_3$ (10 wt %), and the aqueous was removed. The organic was washed three times with 200 mL portions of water, and the aqueous was removed. The organic was dried over sodium sulfate, filtered, and the solvent removed via vacuum distillation at 55° C. to give a non-viscous orange liquid.

Example 16: Mixed bis((allyl/benzyl)cyclopentadienyl)xylylene-dicyclopentadiene- and bis((allyl/benzyl)cyclopentadienyl)ethane-dicyclopentadiene-oligomer The orange non-viscous resin of Example 15 was heated at 150° C. for a total of 3 hours to obtain an orange semisolid.

Polymerization Example 1

Oligomer of Example 16 was mixed with thermal acid generator 0.2% K-pure CXC-1612 and 2.2% dicumyl peroxide and sandwiched between glass plates with a Teflon spacer. This panel was cured for 2 hours at 120° C. and 2 hours at 220° C. The cured solid material displayed an E' of 173° C. and a Df<0.003 at 5 GHz.

Polymerization Example 2

The oligomer of Example 16 was mixed with 1.0% thermal acid generator K-pure CXC-1614 and sandwiched between glass plates with a Teflon spacer. This panel was cured for 2 hours at 120° C. and 2 hours at 220° C. The cured solid material displayed an E' of 173° C. and a Df<0.003 at 5 GHz.

Polymerization Example 3

Oligomer of Example 16 was mixed with 0.54% transition metal complex Reaxis C129 and 2.0% dicumyl peroxide and sandwiched between glass plates with a Teflon spacer. This panel was cured for 2 hours at 120° C. and 2 hours at 220° C. The cured solid material displayed a Tg (TMA) of 223° C. and a Df<0.0025 at 5 GHz.

Polymerization Example 4

The oligomer of Example 16 was mixed with 1.0% transition metal complex Mn Octonoate and sandwiched between glass plates with a Teflon spacer. This panel was cured for 2 hours at 120° C. and 2 hours at 220° C. The cured solid material displayed a Df<0.003 at 5 GHz.

Polymerization Example 5

The oligomer of Example 16 was mixed with 0.2% acid catalyst SpeedCure 939 and sandwiched between glass plates with a Teflon space. This panel was cured for 2 hours at 150° C. and 2 hours at 220° C. The cured solid material displayed an E'=261 Df<0.0025 at 5 GHz.

Polymerization Example 6

The oligomer of Example 16 was mixed with 1.0% acid catalyst SpeedCure 938 and sandwiched between glass plates with a Teflon spacer. This panel was cured for 2 hours at 150° C. and 2 hours at 220° C. The cured solid material displayed an E'=268; Df<0.003 at 5 GHz.

Polymerization Example 7

The oligomer of Example 16 was mixed with 3% Trigonox E145-85 and sandwiched between glass plates with a Teflon spacer. This panel was cured for 2 hours at 150° C. and 2 hours at 220° C. The cured solid material displayed a Tg (TMA)=190° C. and a Df<0.003 at 5 GHz.

Polymerization Example 8

Oligomer 2 was mixed with 1% dicumyl peroxide, and the resin was sandwiched between glass plates with a Teflon spacer. This panel was cured for 2 hours at 250° C. The cured solid material displayed an E' of 200° C. and a Df<0.002 at 5 GHz.

Polymerization Example 9

Oligomer 2 was mixed with 1% photo-acid catalyst Deuteron 1242, and the resin was sandwiched between glass plates with a Teflon spacer. This panel was cured for 2 hours at 250° C. The cured solid material displayed an E' of 180° C. and a Df<0.002 at 5 GHz.

Polymerization Example 10

Oligomer 16 was mixed with 1% photo-acid catalyst Deuteron 1242, and the resin was sandwiched between glass plates with a Teflon spacer. This panel was cured for 2 hours at 120° C. and 2 hours at 220° C. The cured solid material displayed an E' of 260° C. and a Df<0.003 at 5 GHz.

Polymerization Example 11

Oligomer 14 was mixed with 1% dicumyl peroxide, and the resin was sandwiched between glass plates with a Teflon spacer. This panel was cured for 2 hours at 250° C. The cured solid material displayed a Df<0.003 at 5 GHz.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A polymer, copolymer or oligomer derived from a resin having a structure defined by Formula (I)

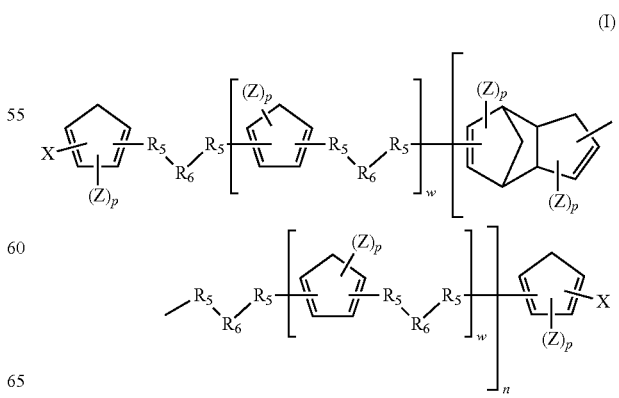

wherein:
a. each $R_5$ is independently a methylene group ($CH_2$), or a methylene group substituted with one or more —H, —$CH_3$, or halogen functionalities;
b. each $R_6$ is independently a bond or a straight-chain or branched, linear or cyclic, saturated or unsaturated, substituted or unsubstituted, aliphatic or aromatic group having between 1 and 20 carbon atoms;
c. each X is independently a functionality possessing at least one non-aromatic alkene, alkyne, $CH_3$—$(CH_2)_n$—(where n=0 to 12), or an aromatic moiety;
d. each Z is independently either H or X, and each p is independently an integer from 1-4;
e. each w is independently 0, or an integer greater than or equal to 1, and
   i. when w is 0, the bracket region represents a bond and n is an integer greater than or equal to 1;
and wherein the polymer, copolymer or oligomer comprises a dissipation (Df) value ranging from between about 0.0001 to about 0.004.

2. The polymer, copolymer or oligomer of claim 1 wherein w=0, said resin being defined by Formula (II)

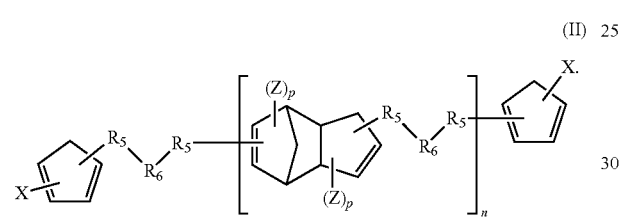

(II)

3. The polymer, copolymer or oligomer of claim 1, wherein $R_5$ is methylene (—$CH_2$—) and $R_6$ is a bond or an aliphatic carbon chain of the form —$(CH_2)_y$—, wherein y=1-12.

4. The polymer, copolymer or oligomer of claim 1, wherein $R_5$ is methylene (—$CH_2$—), and $R_6$ is a member selected from the group consisting of phenyl, napthyl, anthryl, and biphenyl.

5. The polymer, copolymer or oligomer of claim 1, wherein $R_5$ is methylene (—$CH_2$—), and each $R_6$ is selected from at least two independently defined groups.

6. The polymer, copolymer or oligomer of claim 1, wherein X is a member

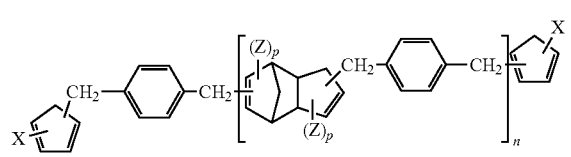

and isomers thereof, and;
b. a second resin comprises a structure:

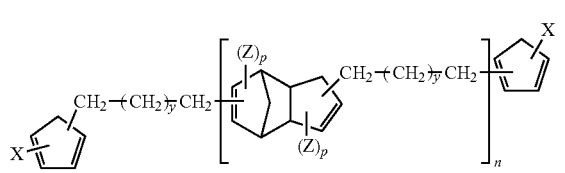

and isomers thereof;

wherein
(i) each X is independently an allyl, vinylbenzyl benzyl, or styrenyl group, and;
(ii) each Z is independently either H or X, and each p is independently an integer from 1-4;
(iii) n is 0 and the bracket region represents a bond, or n is an integer greater selected from the group consisting of propenylbenzene, ethenylbenzene, (methyl)ethenylbenzene, styrenyl, allyl, propargyl, butenyl, and benzyl group.

7. The polymer, copolymer or oligomer of claim 1, wherein X is a member selected from the group consisting of

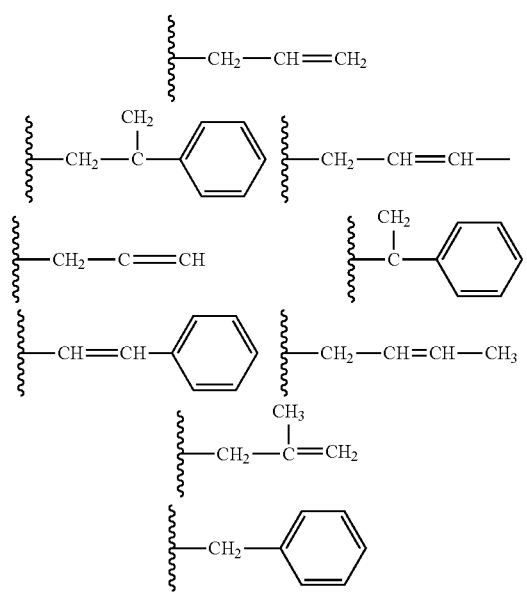

and isomers thereof.

8. A polymer, copolymer or oligomer derived from one or more resins having a structure defined by Formula (II)

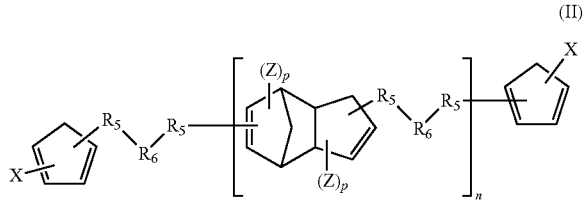

(II)

wherein:
(a) each $R_5$ is a methylene group ($CH_2$);
(b) each $R_6$ is independently a bond, a phenyl group, or an aliphatic carbon chain of the form —$(CH_2)_y$—, wherein y=1-12;
(c) each X is independently an allyl, propargyl, butenyl, benzyl, or styrenyl group;
(d) each Z is independently either H or X, and each p is independently an integer from 1-4;
(e) n is an integer greater than or equal to 1.

9. The polymer, copolymer or oligomer of claim 8, wherein the polymer, copolymer or oligomer is soluble in an organic solvent selected from the group consisting of Methyl ethyl ketone (MEK), Xylenes, N-Methyl pyrrolidone (NMP), Dimethylformamide (DMF), Dichloromethane (DCM), Acetonitrile, Acetone, Dimethyl sulfoxide (DMSO), and Tetrahydrofuran (THF).

10. The polymer, copolymer or oligomer of claim 8, wherein the polymer, copolymer or oligomer comprises a weight average molecular weight ranging from about 200 to about 1,000,000 Da.

11. The polymer, copolymer or oligomer of claim 8, further comprising an additive selected from the group consisting of adhesion agents, peroxides, crosslinking agents, antioxidants, flame retardants, diluents and fillers.

12. The polymer, copolymer or oligomer of claim 8, wherein the polymer, copolymer or oligomer comprises a dielectric (Dk) value ranging from between about 1.5 to about 3 at 1-50 GHz.

13. The polymer, copolymer or oligomer of claim 8, wherein the polymer, copolymer or oligomer comprises a dissipation (Df) value ranging from between about 0.0001 to about 0.004 at 1-50 GHz.

14. A composition comprising (i) a polymer, copolymer or oligomer of claim 8; and (ii) a second component selected from the group consisting of polyethylenes, polypropylenes, polybutylenes, low vinyl polybutadienes, high vinyl polybutadienes, polystyrenes, butadiene-styrene copolymers, styrene-maleic anhydride (SMA) polymers, acrylonitrile-butadiene- styrene (ABS) polymers, polydicyclopentadienes, epoxies, polyurethanes, cyanate esters, poly(phenylene oxide), ethylene-propylene-diene monomer (EPDM) polymers, cyclic olefin copolymers (COC), polyimides, bismaleimides, phosphazenes, olefin-modified phosphazenes, acrylates, vinyl esters, polylactones, polycarbonates, polysulfones, polythioethers, polyetheretherketones (PEEK), polydimethylsiloxanes (PDMS), polyethylene terephthalates (PET), and polybutylene terephthalates (PBT), styrene, divinylbenzene, 1,2-bis(vinylphenyl)ethane, vinylbenzyl ether compounds, vinyl ether compounds, allyl ether compounds, vinylphenyl monomers, vinyl monomers, and allyl monomers.

15. A copolymer derived from polymerization of the polymer, copolymer, or oligomer of claim 8, and a comonomer, wherein the comonomer is selected from the group consisting of styrene, divinyl benzene, vinyl toluene, methyl styrene, tert-butyl styrene, alpha-methyl styrene, alpha-methyl styrene dimer, vinyl cyclohexene, ethylidene norbornene, vinyl norbornene, alpha- pinene, beta-pinene, limonene, other terpenes, polybutadienes, modified polybutadienes, polystyrenes (homopolymer and block-copolymers), modified polystyrenes, polyterpenes, other vinyl-reactive monomers, and reactive dimers/oligomers/polymers/copolymers thereof.

16. A polymer, copolymer or oligomer of claim 8 wherein the polymer, copolymer or oligomer is a solid material with Tg greater than 150° C. and the polymer is cured thermally without catalyst or cured with peroxides or other free radical catalysts with or without use of additional co-catalysts.

17. A polymer, copolymer or oligomer of claim 8 wherein the polymer, copolymer or oligomer is a solid material with Tg greater than 150° C. and the polymer is cured with cationic catalysts, thermal acid generators (TAGS), and/or photo-acid generators (PAGs) with or without use of additional co-catalysts.

18. A printed circuit board, prepreg, or laminate comprising a material comprised of the polymer, copolymer or oligomer of claim 8.

19. A radome or satellite structure comprising a material comprised of the polymer, copolymer or oligomer of claim 8.

20. A base station, circuit board, server, or router comprising a material comprised of mer, copolymer or oligomer of claim 8.

21. A material for use as a substrate, film or laminate in any one of: (i) a copper-clad laminate (CCL), (ii) a high-density interconnect (HDI) substrate, (iii) an integrated circuit (IC) substrate in printed circuit boards at high temperature and low Df applications; (iv) a molding compound in power device application; and (v) a radio frequency (RF) heating in oil and gas applications, wherein the material comprises the polymer, copolymer, or oligomer of claim 8.

22. A 3D printing resin composition comprised of the polymer, copolymer or oligomer of claim 8 suitable for digital light printing (DLP), continuous liquid interface printing (CLIP), Stereo-lithography (SL).

23. A polymer, copolymer, or oligomer derived from at least two resins wherein a. a first resin comprises a structure:

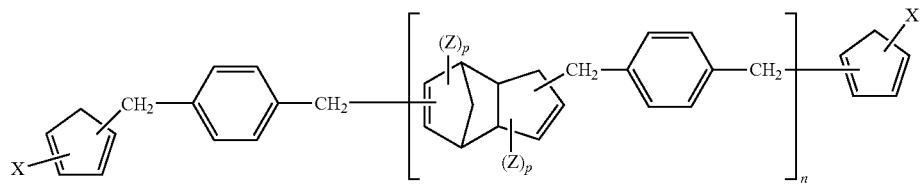

and isomers thereof, and;

b. a second resin comprises a structure:

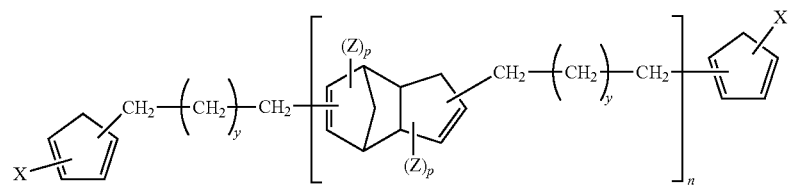

and isomers thereof;

wherein
- (i) each X is independently an allyl, vinylbenzyl, benzyl, or styrenyl group, and;
- (ii) each Z is independently either H or X, and each p is independently an integer from 1-4;
- (iii) n is 0 and the bracket region represents a bond, or n is an integer greater than or equal to 1, and;
- (iv) y=1-12, and;

the polymer, copolymer, or oligomer comprises a dissipation value (Df) value ranging from about 0.0001 to about 0.004.

24. A polymer, copolymer or oligomer of claim 23 comprising a solid material with Tg greater than 150° C. wherein:
- (a) the polymer is cured thermally without a catalyst;
- (b) the polymer is catalyzed thermally with thermal acid generators (TAGS), and/or peroxides; or the polymer is catalyzed via UV light using photo-acid generators (PAGs).

* * * * *